United States Patent [19]
Gaibler et al.

[11] 3,918,742
[45] Nov. 11, 1975

[54] MATERIAL LOADER FRAME CONSTRUCTION

[75] Inventors: Dennis W. Gaibler; John E. Olson, both of Portland, Oreg.

[73] Assignee: Cascade Corporation, Portland, Oreg.

[22] Filed: May 17, 1974

[21] Appl. No.: 470,869

[52] U.S. Cl. ............... 280/150.5; 52/111; 212/145; 214/75 H; 248/2; 248/14
[51] Int. Cl.²......................................... B60S 9/00
[58] Field of Search ............... 248/214, 228, 2, 14; 211/55, 128, 88, 41; 52/111, 112; 280/150.5; 108/97, 101; 214/75 H; 212/55, 83, 11, 144, 22

[56] References Cited
UNITED STATES PATENTS

| | | | |
|---|---|---|---|
| 2,292,353 | 8/1942 | Ennis et al. | 214/75 H |
| 2,804,216 | 8/1957 | Farnam | 214/75 H |
| 2,826,280 | 3/1958 | Troche et al. | 52/111 |
| 2,980,269 | 4/1961 | Zimmerman | 214/75 G |
| 3,715,046 | 2/1973 | Marklund | 214/670 |
| 3,784,035 | 1/1974 | Dunbar | 214/75 H |

*Primary Examiner*—Frank E. Werner
*Assistant Examiner*—Lawrence J. Oresky
*Attorney, Agent, or Firm*—Kolisch, Hartwell, Dickinson & Stuart

[57] ABSTRACT

A modular frame construction for a vehicle-mounted material loader, including separate, releasably joinable base and tower sections. The base section is adapted for mounting directly on the frame of a conventional heavy-duty truck at nearly any desired location therealong, and in different, reversed orientations. The base carries a pair of outrigger-type lateral stabilizers for the loader, and includes a pair of tower support platforms offset vertically and longitudinally of the truck from one another. The tower section is adapted for mounting a conventional load-handling boom, and is mountable on either of the support platforms provided in the base. The disclosed construction provides a highly flexible mounting system adaptable to different types of vehicles and loading operations.

6 Claims, 6 Drawing Figures

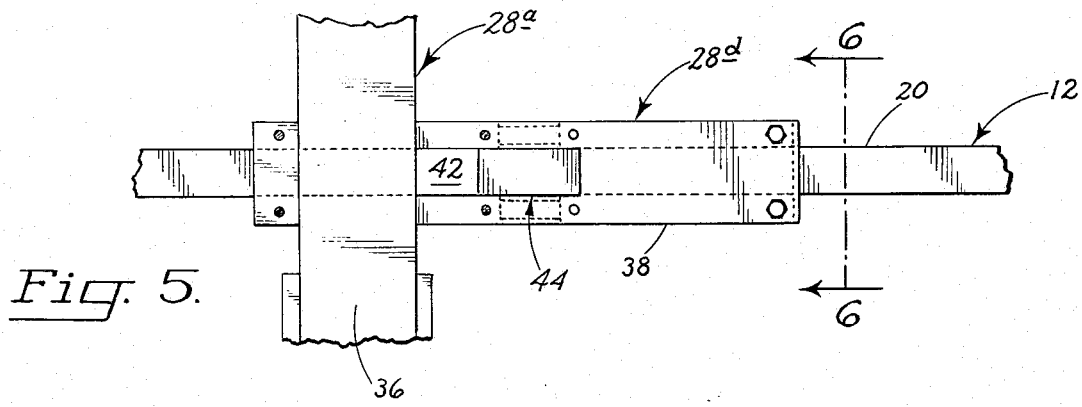
Fig. 5.
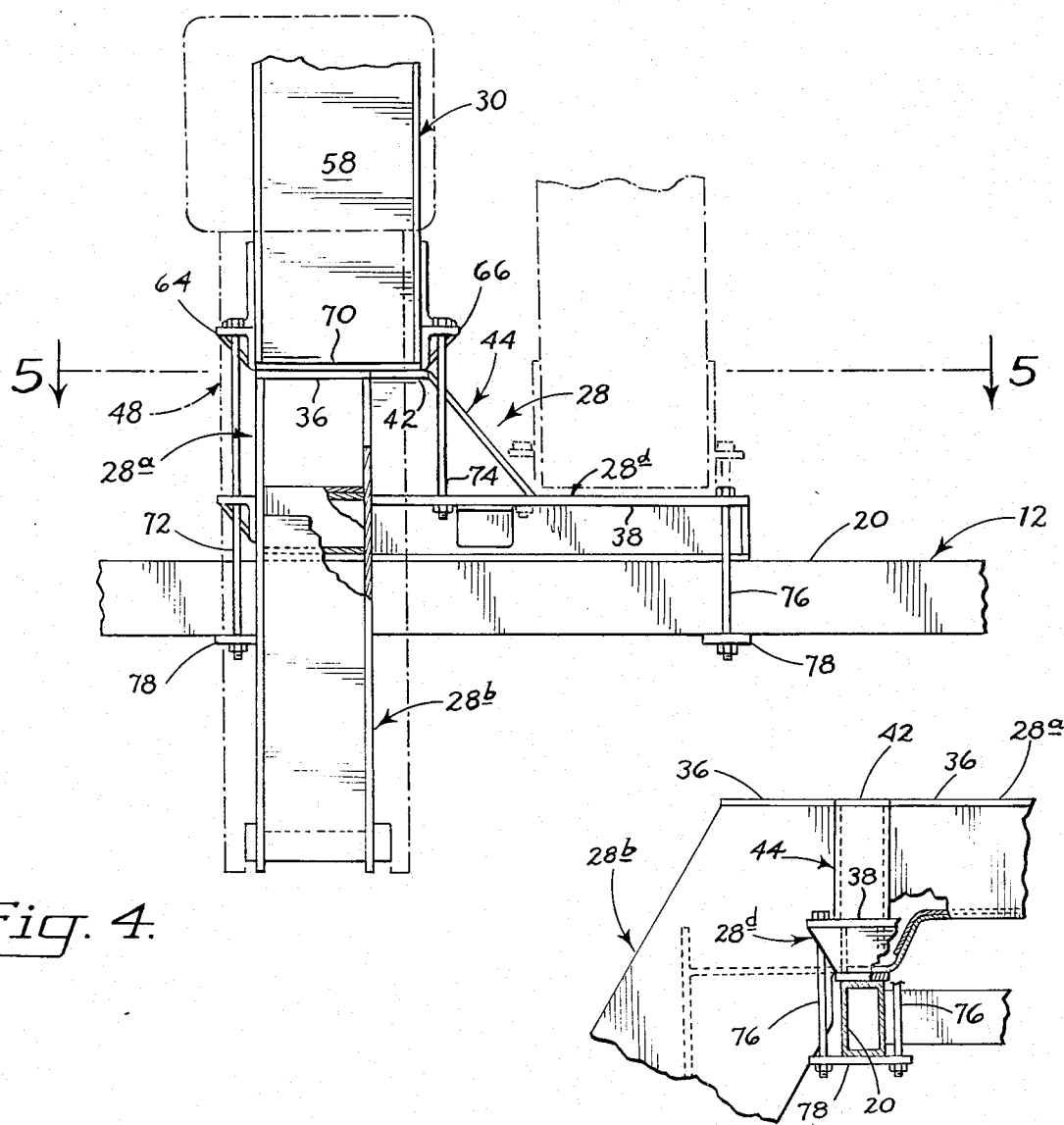
Fig. 4.
Fig. 6.

MATERIAL LOADER FRAME CONSTRUCTION

BACKGROUND AND SUMMARY OF THE INVENTION

The present invention relates generally to material loaders of the type adapted for mounting on the chassis of a heavy-duty truck or similar vehicle. More particularly, the invention relates to a novel modular frame construction for such a loader, including framework for supporting a maneuverable, load-handling boom, and for mounting the loader on a truck chassis of the type comprising a pair of spaced-apart, substantially parallel rails extending longitudinally of the truck.

Truck-mounted loaders are used in many different applications and on a variety of makes and types of trucks. In the past, the framework for mounting a loader on the chassis of a truck, and for supporting its load-handling boom, has been fabricated as an integral unit, designed for essentially permanent mounting at a specific location on the chassis, and with particular load-handling needs in mind. While satisfactory for the purpose, such custom-designed framework is not readily adaptable for other, different load-handling operations, or for use with other makes and types of vehicles. As a result, it is usually necessary for loader manufacturers to provide a number of different framework variations for each basic loader design--a relatively expensive undertaking because of the increased costs involved in designing, tooling and manufacturing the different variations. However, a loader manufacturer still is not able, normally, except at a greatly increased cost to the customer, to offer loader constructions especially adapted for a particular customer's special need.

Clearly, a need exists for an improved material loader framing system--one providing a frame construction which need not form a permanent part of a vehicle, and which is adaptable for mounting a loader on different makes and types of vehicles, and at different locations on a vehicle to suit different purposes. Accordingly, a general object of the present invention is to provide a material loader frame construction which meets the above-identified need in a practical and satisfactory manner.

A more specific object of the invention is to provide a unique frame construction comprised of modular frame units which can be used separately or combined in different ways as required to suit an individual mounting application, thus providing a highly flexible loader mounting system.

Another object of the invention is to provide a modular frame construction which includes a base section adapted for mounting directly on the frame of a conventional heavy-duty truck at nearly any desired location therealong, and in different orientations with respect to the truck.

Still a further object of the invention is to provide loader mounting framework including a base having multiple platforms adapted for carrying, at different selected heights, a tower for mounting a conventional load-handling boom.

In an exemplified embodiment of the invention, modular framework is provided for mounting a bcom-type material loader on a vehicle having a chassis comprising a pair of generally parallel, longitudinally extending frame members. The framework includes a base section, or base, having a pair of end portions which, with the base mounted on such a vehicle, straddle its frame members and carry outrigger-type stabilizers laterally outward of the frame. The base includes a pair of tower support platforms having different support heights and offset longitudilly of the truck frame from one another. The framework system further includes a tower section, or tower, having a lower end configured for releasable mounting on either of the base's support platforms, and having an upper end adapted for carrying a conventional load-handling boom.

A number of advantages are provided by such framework. To begin with, a loader using a modular frame construction need not become a permanent part of a vehicle. It may be mounted in place at any time, and at nearly any desired location on the vehicle's frame. Moreover, the base section may be mounted in different, reversed positions, so as to locate the tower support platforms, or one of them if only one is of interest, at the precise location where it is desired to mount the tower. The provision of two platforms at different elevations enables selection of the mounting height of the tower so as to accommodate different truck cab heights, different types of loads, etc.

Still another advantage of the construction of the invention is that the several sections of the loader may be disassembled and changed to modify the overall vehicle-loader configuration, and adapted to different types of loading operations. For example, a tower of a different height may be substituted, or, if additional lateral stabilization is required for or desired in a loader-equipped vehicle, an additional base carrying stabilizer mechanisms can be mounted on the vehicle frame.

BRIEF DESCRIPTION OF THE DRAWINGS

These and other objects and advantages of the invention will become more fully apparent as the description which follows is read in conjunction with the accompanying drawings, wherein:

FIG. 4 is a view, on an even larger scale than FIG. 3, taken generally along the line 4—4 in FIG. 3, but omitting certain parts and breaking away certain others for the sake of clarity;

FIG. 5 is a fragmentary top plan view taken along the line 5—5 in FIG. 4, showing portions of one side of a base in the frame construction; and FIG. 6 is a fragmentary view taken generally along the line 6—6 in FIG. 5, but rotated 90° clockwise.

DESCRIPTION OF PREFERRED EMBODIMENT

Figure 1:
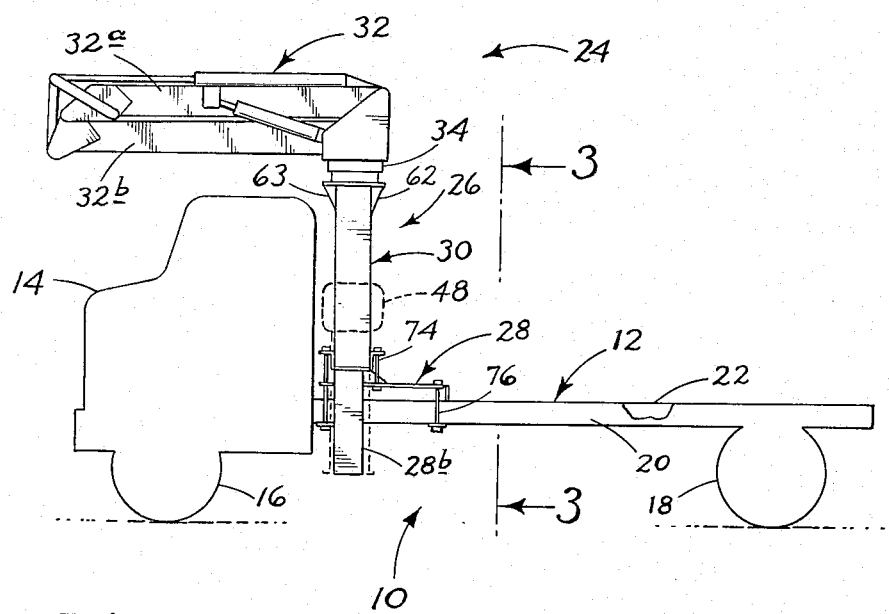
FIG. 1 is a simplified side elevation showing a loader having a modular frame construction as contemplated herein mounted adjacent the forward end of the frame in a conventional heavy-duty truck.

Turning now to the drawings, and referring first to FIG. 1, a conventional heavy-duty commercial vehicle, or truck, is indicated generally at 10. Truck 10 includes the usual longitudinal chassis, or frame, 12 which carries an operator cab 14 at one end, and is supported for travel over the ground by front and rear wheel assemblies 16, 18, respectively. Frame 12 is of conventional rather standardized design, and includes a pair of elongate, parallel, laterally spaced members, or rails, 20, 22. Interconnecting the rails are the usual longitudinally distributed cross members (not shown).

As understood by those skilled in the art, commercial trucks are generally divisible into size ranges on the basis of their gross vehicle weight (GVW) ratings. Although exact standardization between the different manufacturers of such vehicles does not exist, the frames in vehicles within a given size range will have approximately the same frame width. For example, in heavy-duty trucks having GVW ratings between about 20,000 and 60,000 lbs., the width of the frame is generally about 35–36 in. Frame 12 herein has such a width.

Mounted at the forward end of frame 12, immediately behind cab 14, is a boom-type loader 24 which includes a modular frame 26 constructed in accordance with the invention. Loader 24 may be thought of as including three principal sections—a base 28 mounted directly on rails 20, 22, a tower 30 mounted on the base, and a rotatable, foldable boom 32 carried by a rotator 34 on the top of tower 30. Boom 32 and rotator 34 are of conventional construction and need not be described in detail. As will be understood, however, the rotator accommodates removable mounting of the boom on the tower, and enables swinging of the boom in a generally horizontal plane throughout a full 360°. The boom includes the usual pivotally connected boom sections, such as the two shown at 32a, 32b, which may be maneuvered under power in a conventional way during boom operation.

Considering the construction of modular frame 26, which, as mentioned, is made up of separate base and tower sections, it should be noted at the outset that the specific construction details of these sections are of no critical importance in the invention. Rather, what is important is the overall concept of a loader frame having two releasably joinable parts, a base and a tower, the base being adapted to seat at a virtually infinite number of positions on a vehicle frame such as frame 12, and, as will be explained, the base affording a pair of tower mounting locations enabling mounting of the tower thereon at different selected heights. For this reason, only the key elements in base 28 and tower 30 will be discussed with any specificity.

Considering together FIGS. 1 and 3–6, inclusive, base 28 may be thought of as including an elongate central portion 28a (see particularly FIG. 3), adapted to extend transversely across the top of a vehicle frame, and which carries at its opposite ends, downwardly and outwardly inclined end portions, or wings, 28b, 28c. These three portions are formed of plates suitably arranged and joined, as by welding, to provide good rigidity and dimensional stability.

Figure 3:
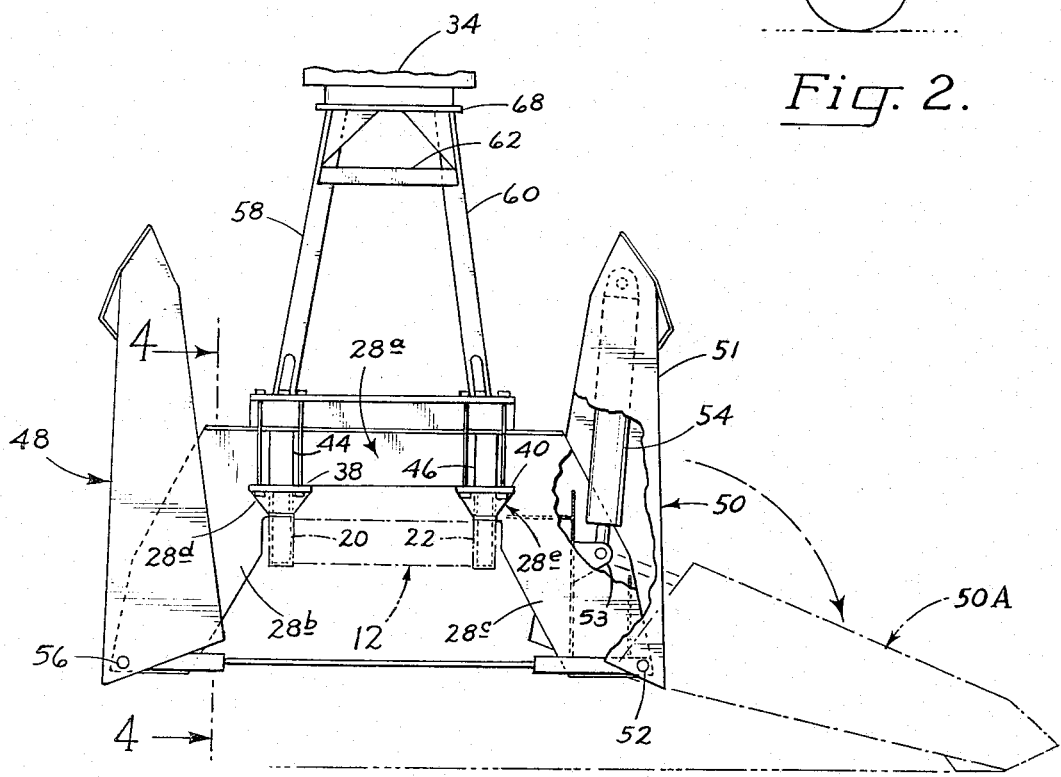
FIG. 3 is an enlarged fragmentary view taken generally along the line 3—3 in FIG. 1.

Base 28 also includes a pair of elongate feet 28d, 28e, joined, as by welding, to the underside of central portion 28a adjacent wings 28b, 28c, respectively (see again particularly FIG. 3). Like the central and leg portions of the base, the feet suitably are made up of welded plates or channels. Legs 28d, 28e are disposed substantially parallel to one another and are suitably sized and spaced so as to seat, as nearly directly as possible, on the tops of a truck's frame rails, such as rails 20, 22 in frame 12.

As discussed earlier, trucks within a given GVW range generally have about the same frame width. Thus, in constructing base 28, its parts are sized appropriately for the weight range of trucks for which it is intended. Conventional truck frame sizes are well known, so it is an easy matter to construct the base so that it straddles and seats upon the truck's frame rails.

Certain parts play a particular role in the performance of base 28. These include an elongate plate 36 which defines the top surface of the base's central portion 28a, and which extends over the tops of feet 28d, 28e, and plates 38, 40 which define the tops of feet 28d, 28e, respectively. Also playing an important role are the top plates, such as plate 42 (see FIGS. 4, 5 and 6) which form part of gusset or bracing structures 44, 46. Each plate 42 is coplanar with plate 36, with its top surface substantially flush with the top surface of plate 36.

The importance of the just-mentioned plates is that they define in base 28 a pair of platforms for receiving and mounting tower 30. More specifically, the top surfaces of plates 36, 42 define an upper support platform, and the top surfaces of plates 38, 40, where these plates extend beyond bracing structures 44, 46 (e.g., to the right of these structures in FIG. 4), define a lower support platform. As is clearly evident in the drawings, the two support platforms are offset from one another both vertically and longitudinally of frame 12. The exact amount of offset in either direction is a matter of choice. In the particular base illustrated herein, the lateral spacing between the centers of these decks is about 23½ inch, and the vertical separation is about 9½ inch. Also a matter of choice, of course, are the exact configurations and sizes of the plates forming the two platforms.

As best shown in FIG. 3, wings 28b, 28c of the base are constructed to carry outrigger-type loader stabilizing mechanisms, such as stabilizers 48, 50, respectively. Stabilizers 48, 50 are substantially identical in construction, though constructed to be the mirror images of one another. In general terms, stabilizer 50 includes an elongate arm 51 pivoted at 52 adjacent the lower outer end of wing 28c for swinging in a generally vertical plane between a raised and stored position, shown in solid outline, and a lowered, ground-engaging position, shown in dash-dot outline at 50A. The opposite ends of a dual-acting ram 54 pivotally interconnect the outer, free end of arm 51 with a bracket 53 mounted within wing 28c. Similarly, stabilizer 48 is pivoted at 56 on wing 28b, and is swingable between a raised, stored position and a lowered, ground-engaging positions by a dual-acting ram (concealed). The rams in the stabilizers 48, 50 are connected in the usual manner to a conventional source of hydraulic fluid under pressure, permitting independent extension and contraction to swing the arms in the manner described.

It will be appreciated by those skilled in the art that any one of a number of different types of stabilizer mechanisms may be mounted on base 28. The one specifically illustrated (though not in great detail) is similar in many respects to the stabilizer mechanism disclosed in a prior-filed copending U.S. patent application Ser. No. 460,334, entitled "Dual Mode Stabilizer Assembly", filed Apr. 12, 1974, by the applicants herein.

While the details of construction and mounting of the specific stabilizer mechanisms are not important with respect to the present invention, what is important is that base 28 includes wings 28b, 28c adapted for carrying such mechanisms. In addition to the lateral stabilization provided a loader-equipped truck, such as that shown in FIG. 1, where additional lateral stabilization is required for or desired in a vehicle, a separate stabilizer-carrying base can be mounted on the vehicle's frame, and used solely for the purpose of facilitating stabilization.

Figure 2:
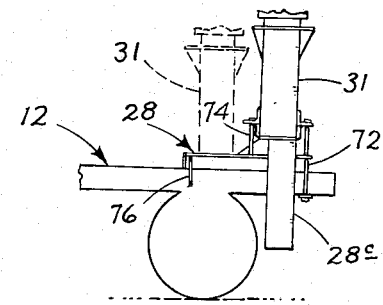
FIG. 2 is a fragmentary side elevation illustrating the mounting of a loader at the rear end of the frame in a truck (such as the truck shown in FIG. 1), with an alternative arrangement of the loader's base and tower components shown in phantom outline.

It should be apparent from the construction of base 28 that it can be mounted at a nearly infinite number of different selected positions along frame 12, assuming adequate clearance is provided along the length of the frame. Further, it will be evident that the base can be mounted in different, reversed positions on the frame. For example, in FIG. 1, base 28 is shown mounted so that its upper support platform is disposed to the left of the lower platform. FIG. 2 shows a reversed-position mounting for the base on frame 12. As should be apparent, this feature provides additional loader mounting versatility.

The construction of base 28, particularly the provision of elongate feet 28d, 28e extending along and seated on frame rails 20, 22, has the additional benefit of providing increased rigidity for the truck's frame when secured thereto in the manner to be described.

There are no special construction features characterizing the boom-supporting tower, except that it be adequately sized and configured at its bottom end to mount on either of the two support platforms in the base, and that it be adequately sized and configured at its top end to carry a load-handling boom, such as boom 32. In other words, the specific construction of the tower, apart from these two considerations, is not critical as long as it possesses sufficient structural rigidity and dimensional stability. The height of the tower also is a matter of choice, and depends on the mounting location and the truck frame, the type of boom to be carried, the height of the truck cab, etc. Tower 30 (FIGS. 1, 3 and 4) has a height of about 58 inches. In FIG. 2, a somewhat shorter tower 31, having a height of about 46 inches, is shown.

The tower shown in FIGS. 1, 3 and 4 includes a pair of upwardly converging, laterally spaced pillars 58, 60 interconnected adjacent their upper ends by cross braces 62, 63, and adjacent their lower ends by right angle members 64, 66. The tops of pillars 58, 60 carry a substantially horizontal deck 68 adapted to receive previously mentioned rotator 34. The bottom ends of pillars 58, 60 are provided with suitable caps, such as the cap formed by plate 70 (FIG. 4), and are spaced so as to enable centering over plates 36, 42 defining the base's upper support platform, and plates 38, 40 defining its lower support platform.

Towers 30 or 31 are shown in solid outline mounted on base 28's upper support platform in all of the figures in the drawings. However, lower platform mounting of tower 31 is shown in phantom outline in FIGS. 2 and 4.

A boom-supporting tower is secured on base 28, and the base secured to frame 12, by a plurality of elongate nut and bolt assemblies, such as the assemblies shown at 72, 74, 76 in FIG. 4. As illustrated, assemblies 72 extend between truck frame 12 and tower 30, clamping the tower and the base to the frame. The upper ends of assemblies 72 act against the upper flange of angle member 64, with the bolt extending through a suitable accommodating bore provided in a portion of base 28. The lower end of the bolt extends through a cross bar 78 which extends beneath the frame rails as shown in FIG. 6. The nuts and bolts in assemblies 74 clamp the tower and leg together as shown, and the nuts and bolts in assemblies 76 clamp the outer ends of feet 28d, 28e in base 28 to frame 12. The exact placement and numbers of such assemblies are chosen to provide for adequate securement of the tower, base and vehicle frame. In the particular construction shown herein, two each of assemblies 72, 74, 76 are used for each rail, a total of six assemblies in all.

It will be obvious that with such construction it is a relatively easy matter, simply by removing the nut and bolt assemblies, to change both the configuration and the disposition of the parts in a modular frame construction. As was pointed out earlier, this provides a great many advantages. For example, it allows a user to tailor a loader construction to his particular use or type of load. It also allows a loader to be moved from one vehicle to another, or to a different location on a vehicle. Many other advantages will occur to those familiar with the drawbacks of prior art framework designs.

Although a preferred embodiment has been described herein, it is understood that variations and modifications are possible without departing from the spirit of the invention.

It is claimed and desired to secure by Letters Patent:

1. A modular frame construction for a boom-type material loader of a type adapted for mounting on a pair of generally parallel, longitudinally extending frame members comprising the chassis of a vehicle or the like, said construction including separate base and tower modules, wherein said base module includes means for seating on the frame members of such a chassis and for accommodating releasable securing of the base module to the chassis, and means defining a pair of support platforms for demountably receiving and supporting said tower module, each of said platforms being disposed at a different elevation, and being displaced laterally of one another in the base module, and said tower module comprises an elongate structure having upper and lower ends, and includes means adjacent the upper end thereof for carrying a load-handling boom assembly, and means adjacent the lower end thereof configured for selective releasable mounting on either of said support platforms.

2. The modular frame construction of claim 1, wherein said base module additionally includes loader stabilizing means for engaging the ground on either side of the chassis on which said module is secured, said stabilizing means comprising a pair of stabilizing members mounted for movement relative to said chassis into and out of engagement with the ground.

3. The modular frame construction of claim 2, wherein said base module comprises an elongate structure disposed transversely of the frame members on which the module is seated, with opposite end portions of said structure extending outwardly of said members, and wherein said stabilizing members comprise movable stabilizing arms, one mounted on each of said end portions for pivotal movement relative to said frame members.

4. Modular framework for a boom-type loader adapted to be carried on a vehicle chassis having longitudinally-extending, generally parallel frame members, said framework including separate base and tower portions wherein said base portion includes means for seating on the members of such a chassis and for accommodating securing of the base portion to the chassis, and means defining a pair of support platforms for receiving and supporting said tower portion, each of said platforms being disposed at a different elevation, and said tower portion comprises an elongate, generally upright structure having upper and lower ends, and includes means adjacent the upper end thereof for carrying a boom assembly, and means adjacent the lower end thereof configured for selective mounting on either of said support platforms.

5. The modular framework of claim 4, wherein said support platforms are displaced longitudinally of the chassis from one another when said base portion is seated on said frame members.

6. The modular framework of claim 4, wherein said base portion includes means for laterally stabilizing said loader when mounted on such a vehicle, said means comprising a pair of lateral stabilizing members mounted for movement relative to said frame members into and out of engagement with the ground on either side of said chassis.

* * * * *